United States Patent
Kang et al.

(10) Patent No.: US 8,289,305 B2
(45) Date of Patent: Oct. 16, 2012

(54) BACKLIGHT UNIT, LIQUID CRYSTAL DISPLAY DEVICE HAVING THE SAME AND CONTROL METHOD THEREOF

(75) Inventors: Jeong-il Kang, Yongin-si (KR); Sang-hoon Lee, Ulsan (KR); Su-gun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 951 days.

(21) Appl. No.: 11/867,337

(22) Filed: Oct. 4, 2007

(65) Prior Publication Data
US 2008/0204395 A1 Aug. 28, 2008

(30) Foreign Application Priority Data
Feb. 26, 2007 (KR) .................. 10-2007-0019075

(51) Int. Cl.
*G05F 1/00* (2006.01)
(52) U.S. Cl. ........ 345/211; 315/224; 315/219; 315/247; 315/307; 315/291; 345/102; 362/97.2
(58) Field of Classification Search .................. 345/102, 345/211; 315/291, 224, 219, 247, 307; 362/97.1–97.4
See application file for complete search history.

(56) References Cited

U.S. PATENT DOCUMENTS

| 7,459,864 | B2 * | 12/2008 | Lys .............................. 315/291 |
| 7,504,782 | B2 * | 3/2009 | Hasegawa et al. ............ 315/307 |
| 7,723,926 | B2 * | 5/2010 | Mednik et al. ................ 315/291 |
| 7,737,643 | B2 * | 6/2010 | Lys .............................. 315/291 |
| 2004/0095081 | A1 * | 5/2004 | Kernahan ....................... 315/307 |
| 2005/0047181 | A1 * | 3/2005 | Yamamoto et al. ............. 363/60 |
| 2005/0218838 | A1 * | 10/2005 | Lys .............................. 315/291 |
| 2005/0231133 | A1 * | 10/2005 | Lys .............................. 315/291 |
| 2005/0275391 | A1 * | 12/2005 | Ito et al. ........................ 323/282 |
| 2006/0132061 | A1 * | 6/2006 | McCormick et al. .......... 315/291 |

FOREIGN PATENT DOCUMENTS

| CN | 1716039 A | 1/2006 |
| JP | 2005-039976 A | 2/2005 |
| JP | 2005-353423 A | 12/2005 |
| KR | 10-2002-0017358 A | 3/2002 |

* cited by examiner

*Primary Examiner* — Lun-Yi Lao
*Assistant Examiner* — Kelly B Hegarty
(74) *Attorney, Agent, or Firm* — Sughrue Mion, PLLC

(57) ABSTRACT

A liquid crystal display device, includes: a liquid crystal panel; a point light source which emits light to the liquid crystal panel; and a light source driver which comprises a power input terminal to receive initial power, a power supply to supply power to the point light source according to the initial power and a reference current, and a reference current controller to output the changed reference current according to the changed initial power, to the power supply.

15 Claims, 7 Drawing Sheets

BACKLIGHT UNIT, LIQUID CRYSTAL DISPLAY DEVICE HAVING THE SAME AND CONTROL METHOD THEREOF

CROSS-REFERENCE TO RELATED APPLICATIONS

This application claims priority from Korean Patent Application No. 10-2007-0019075, filed on Feb. 26, 2007, in the Korean Intellectual Property Office, the disclosure of which is incorporated herein by reference.

BACKGROUND OF THE INVENTION

1. Field of the Invention

Apparatuses and methods consistent with the present invention relate to a backlight unit, a liquid crystal display device having the same, and a control method thereof, and more particularly, to a backlight unit which includes a point light source, a liquid crystal display device having the same, and a control method thereof.

2. Description of the Related Art

A related art liquid crystal display device employs a light emitting diode (LED) as a light source to improve color realization, instead of a related art cold cathode fluorescent lamp (CCFL). The liquid crystal display device includes a switching element to supply a current to the LED, and controls the switching element through an analog control method or a pulse width modulation (PWM) control method.

To control the LED employing the PWM control method, an amount of the current output to the LED is controlled by determining whether a peak current flowing to the LED reaches a predetermined reference current. FIG. 1 is a graph which illustrates a waveform of an output current with respect to initial power in a related art backlight unit. An axis X in the graph represents one period of the switching element, and an axis Y in the graph refers to a waveform of the current output from the switching element. As shown therein, three current waveforms A, B and C have different switching on times Ton, respectively. The switching element is turned on until the output current reaches the reference current within one period, and turned off for a remaining time in the period.

If the period of the switching element is set as a single value, the amount of the output current increases as the switching on time Ton becomes shorter. An average current amount A' of the current waveform A having the shortest switching on time Ton is larger than average current amounts B' and C' of the current waveforms B and C having longer switching on time Ton.

The switching on time Ton varies depending on a voltage level of the initial power driving the LED. If the peak output current is controlled to drive the LED, the average value of the current output to the LED changes according to the fluctuation of the initial power with respect to constant reference current and period. Here, a problem arises that brightness of the LED becomes ununiform.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a backlight unit which outputs a current from irregular initial power, a liquid crystal display device having the same, and a control method thereof.

According to an aspect of the present invention, there is provided a liquid crystal display device, including: a liquid crystal panel; a point light source which emits light to the liquid crystal panel; and a light source driver which includes a power input terminal to receive initial power, a power supply to supply power to the point light source according to the initial power and a reference current, and a reference current controller to output the changed reference current according to the changed initial power, to the power supply.

The reference current controller decreases the reference current as a voltage level of the initial power is raised.

The reference current controller may include a first terminal to receive an initial reference current, a second terminal to receive partial power divided from the initial power, and a calculator to adjust the initial reference current as the reference current according to the partial power.

The reference current controller may include a microcomputer which stores a lookup table of the reference current corresponding to a voltage level of the initial power.

The power supply may include a switching element which switches a current output to the point light source, and a switching controller which turns on and off the switching element according to the reference current and a pulse width modulation (PWM) dimming signal input from the outside.

A switching on time during which the switching element is turned on in a single period may shorten as a voltage level of the initial power is raised.

The power supply may further include an inductor which is connected between the switching element and the point light source.

The power supply may further include an inductor which is connected between the power input terminal and the switching element.

The power supply may further include a current detecting resistor which detects a current flowing in the inductor.

The power supply may further include a current detecting resistor which detects a current flowing in the inductor.

According to an aspect of the invention, the point light source includes a light emitting diode.

According to another aspect of the present invention, there is provided a backlight unit, including: a light emitting diode; a power input terminal which receives initial power; a power supply which supplies power to the light emitting diode according to the initial power and a reference current; and a reference current controller which outputs the reference current inverse proportional to increase and decrease of the initial power to the power supply.

The reference current controller may include a first terminal to receive an initial reference current, a second terminal to receive partial power divided from the initial power, and a calculator which adjusts the initial reference current as the reference current according to the partial power.

The reference current controller may include a microcomputer which stores a lookup table of the reference current corresponding to a voltage level of the initial power.

The power supply may include a switching element which switches a current output to the light emitting diode, an inductor which is connected with the switching element, and a switching controller which turns on and off the switching element according to the reference current and a PWM dimming signal input from the outside.

A switching on time during which the switching element is turned on in a single period may shorten as a voltage level of the initial power is raised.

According to another aspect of the present invention, there is provided a method of controlling a liquid crystal display device which includes a liquid crystal panel, a point light source to emit light to the liquid crystal panel and a power supply to supply power to the point light source according to initial power and a reference current, the method including: detecting a voltage level of the initial power; and controlling the reference current if the detected voltage level of the initial power is changed.

The controlling the reference current may include decreasing the reference current if the voltage level of the initial power is raised.

The detecting the initial power may include detecting a level of a partial voltage divided from the initial power, and the controlling the reference current may include controlling an initial reference current as the reference current by using the level of the partial voltage and a formula.

The controlling the reference current may include controlling the reference current by using a lookup table of the reference current corresponding to the voltage level of the initial power.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF EXEMPLARY EMBODIMENTS

Hereinafter, exemplary embodiments of the present invention will be described with reference to accompanying drawings, wherein like numerals refer to like elements and repetitive descriptions will be avoided as necessary.

Figure 1:
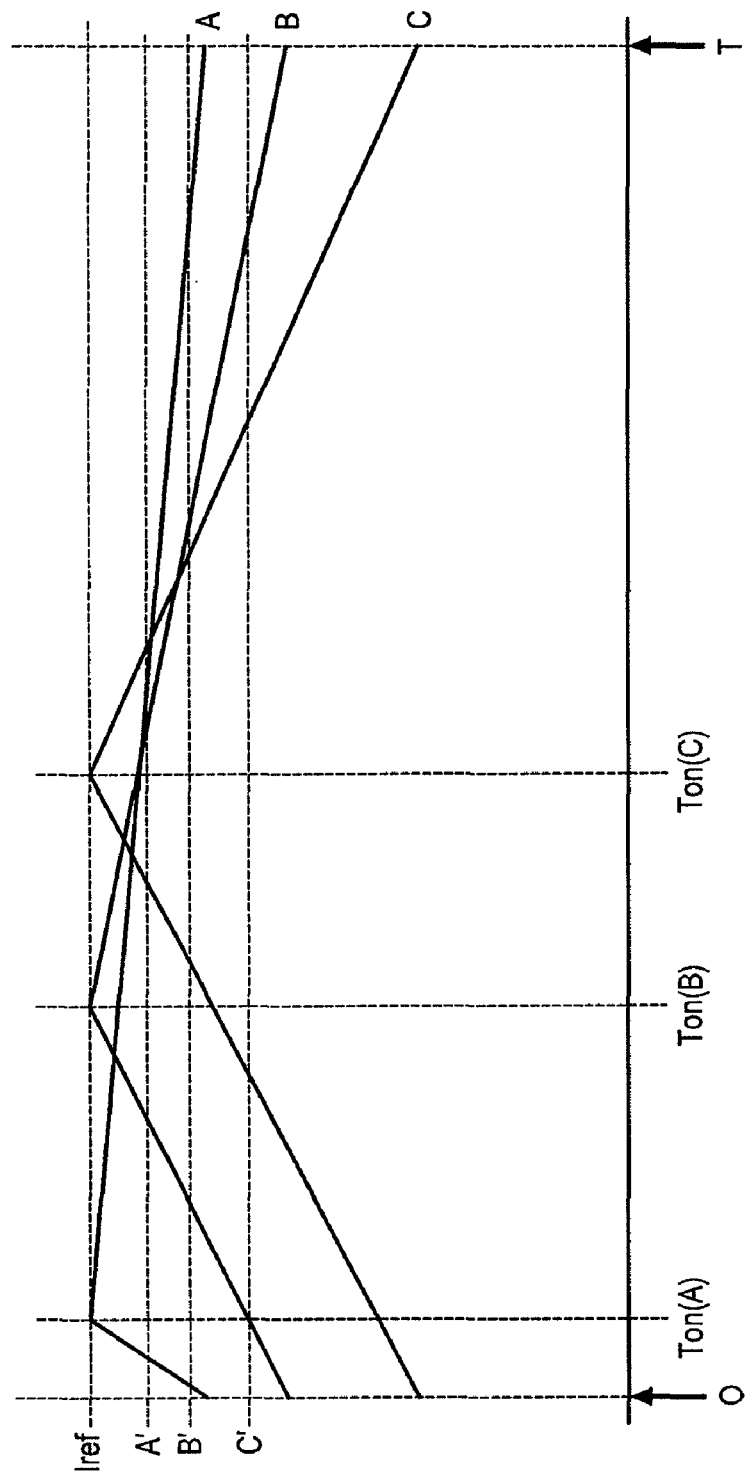
FIG. 1 is a graph which illustrates a waveform of an output current with respect to initial power according to a related art backlight unit.
Figure 2:
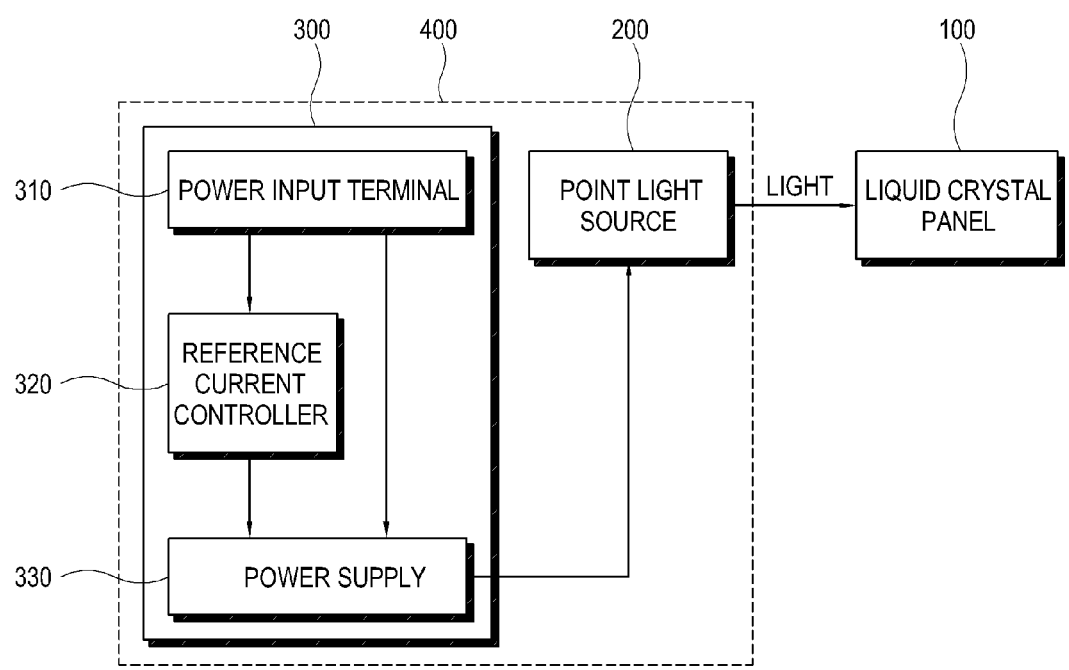
FIG. 2 is a control block diagram of a liquid crystal display device according to a first exemplary embodiment of the present invention.

FIG. 2 is a control block diagram of a liquid crystal display device according to a first exemplary embodiment of the present invention.

As shown therein, a liquid crystal display device according to the first exemplary embodiment of the present invention includes a liquid crystal panel 100 and a backlight unit 400, which emits light to the liquid crystal panel 100. The backlight unit 400 includes a point light source 200, and a light source driver 300 which drives the point light source 200.

The liquid crystal panel 100 includes a first substrate (not shown) having a thin film transistor and a pixel, a second substrate (not shown) facing the first substrate and a liquid crystal layer (not shown) interposed therebetween. A color filter may be formed on one of the first and second substrates, or omitted, depending on a driving method of a light source. The liquid crystal panel 100 does not emit light itself, and forms an image by adjusting arrangement of liquid crystals. Thus, the liquid crystal panel 100 receives light from the backlight unit 400, which is disposed behind the liquid crystal panel 100.

The point light source 200 according to the first exemplary embodiment of the present invention may include a light emitting diode (LED). The point light source 200 receives power from a switching element (described below) of the light source driver 300. The point light source 200 may include an R-LED which emits red light, a G-LED which emits green light, and a B-LED which emits blue light. The point light source 200 may further include various LEDs such as a C-LED emitting cyan light, a Y-LED emitting yellow light, an M-LED emitting magenta light and a W-LED emitting white light.

The light source driver 300 includes a power input terminal 310 to receive initial power, a reference current controller 320 to control a reference current, and a power supply 330 to supply power to the point light source 200 by using the initial power and the reference current. If the backlight unit 400 employs an LED as a light source, brightness of the LED is adjusted with a current flowing in the LED.

The initial power input by the power input terminal 310 refers to power initially input from the outside to drive the point light source 200. The reference current refers to a current serving as a reference of output current supplied from the power supply 330 to the point light source 200.

The power supply 330 supplies a current to the point light source 200 with the initial power, and includes a switching element turned on and off to supply the output current. The output current may be controlled by a pulse width modulation (PWM) control method in which the switching element is turned on and off according to a PWM control signal input from the outside, and an analog control method in which the reference current is controlled. The PWM control method uses and controls a width of a pulse supplied to the switching element. The analog control method uses and controls an amplitude of the pulse. The output current is controlled by one of the PWM and analog control methods, or by both at the same time.

The switching on time Ton defined by a time during which the switching element is turned on in one period varies depending on the initial power. If a voltage level of the initial power is incremented, the switching on time Ton shortens. If the voltage level of the initial power is decremented, the switching on time Ton lengthens. If the PWM control method is used, the switching element is turned on and off so that the output current reaches the reference current of certain constant value. However, the switching on time Ton is varied as the input initial power is changed. If the switching on time Ton is changed, the amount of the current output to the point light source 200 is also changed, thereby causing ununiform brightness of the point light source 200.

To address the ununiform brightness, the reference current controller 320 supplies a reference current which changes corresponding to the changed initial power, to the power supply 330. The reference current controller 320 outputs the reference current inverse-proportional to the changed initial power to uniformly maintain the amount of the current output to the point light source 200, to the power supply 330. As described above, if the voltage level of the initial power is incremented, the switching on time, which is the time for the output current to reach the reference current is shortened, and the amount of the output current increases as a whole. Conversely, if the voltage level of the initial power is decremented, the switching on time for the output current to reach the reference current is lengthened, thereby decreasing the amount of the output current as a whole. Thus, the reference current controller 320 decreases the reference current to reduce the amount of the output current as the voltage level of the initial power is raised.

The power supply 330 supplies power to the point light source 200 according to changed initial current and changed reference current output by the reference current controller 320.

Figure 3:
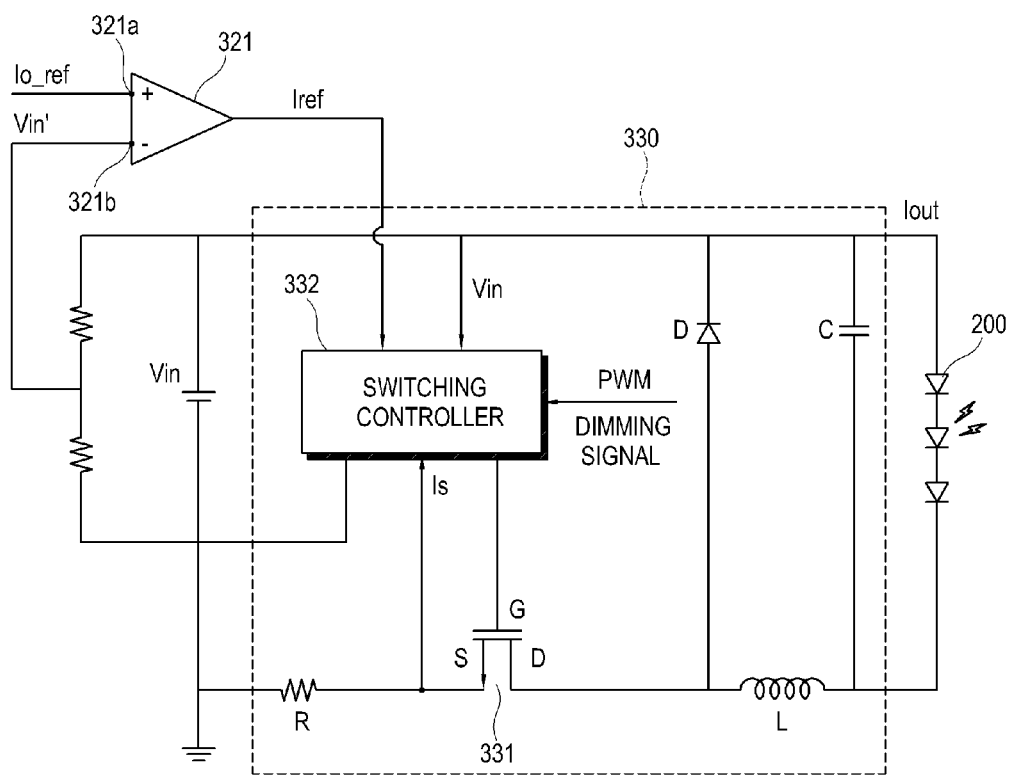
FIG. 3 is a schematic circuit diagram of a backlight unit according to a second exemplary embodiment of the present invention.

FIG. 3 is a schematic circuit diagram of a backlight unit according to a second exemplary embodiment of the present invention. As shown therein, the backlight unit according to the second exemplary embodiment includes a calculator 321 as a reference current controller. A power supply 330 supplies an output current Iout to a point light source 200 with initial power Vin and a reference current Iref output by the calculator 321.

The power supply 330 includes a switching element 331 which switches the current output to the point light source 200, and a switching controller 332 which controls the switching element 331. The power supply 330 further includes an inductor L, a current detecting resistor R, a diode D and a capacitor C.

The inductor L is coupled between the switching element 331 and the point light source 200 to store and discharge the current output by turning on and off the switching element 331. The power supply 330 according to the second exemplary embodiment includes a buck switching circuit which supplies power at a lower voltage level than the initial power Vin, to the point light source 200.

The current detecting resistor R is coupled between the switching element 331 and a ground terminal, and detects a current flowing in the inductor L. According to the second exemplary embodiment, a peak value of the current flowing in the switching element 331 is substantially equivalent to that of the current flowing in the inductor L. An average value of the current flowing in the inductor L is equivalent to that of the current flowing in the point light source 200. Thus, the current flowing in the point light source 200 may be determined with the current detected by the current detecting resistor R. A cathode of the diode D is connected between the switching controller 332 and the point light source 200 while an anode of the diode D is connected between the switching element 331 and the inductor L.

The capacitor C makes the output current Iout substantially stable.

The switching element 331 switches a flow of the current of the initial power Vin to be supplied to the point light source 100, and is turned on and off by a control of the switching controller 332. The switching element 331 may include a metal oxide semiconductor field effect transistor (MOSFET), but is not limited thereto as long as switching element 331 can switch on and off the power. As the switching element 331 is switched on and off, the amount of the current supplied to the point light source 100 repeatedly increased and decreased is adjusted in a wave of triangular form. The brightness of the point light source 200 is determined by the average amount of the current.

The switching element 331 according to the second exemplary embodiment is connected adjacent to the ground terminal, and is controlled without difficulty. If the switching element 331 includes an N type MOSFET, a voltage between a gate and a source of the switching element 331 may range from about 7V~8V to about 12V·15V. The voltage drop which is caused by a current detecting resistor R is about 1V, much smaller than a voltage between the gate and the source. Accordingly, the source terminal S of the switching element 331 may be regarded as the ground terminal to turn on and off the switching element 331. Thus, an additional voltage control of the source terminal S is not necessary.

The switching controller 332 turns on and off the switching element 331 according to a reference current Iref and a PWM dimming signal input from the outside. The PWM dimming signal includes a PWM on section of the period to turn on the point light source 200, and a PWM off section of the period to turn off the point light source 200. The output current flows to the point light source 200 during the PWM on section of the period, and does not flow thereto during the PWM off section of the period. The switching element 331 is turned on and off by the intensity of the current flowing to the point light source 200 during the PWM on section of the period. Accordingly, an average output current with a minute pulsation flows in the point light source 200.

Figure 4:
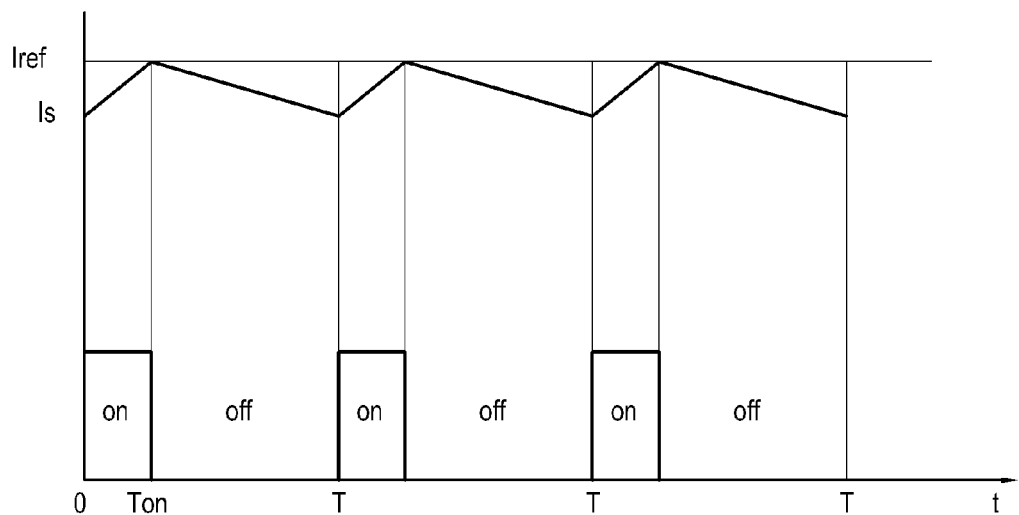
FIG. 4 illustrates a switch control of the backlight unit according to the second exemplary embodiment of the present invention.

FIG. 4 illustrates a current detected by the current detecting resistor R, and turning on and off of the switching element 331 in the PWM on section of the period. The switching controller 332 controls the switching element 331 so that the peak value of the current Is detected through the current detecting resistor R reaches the reference current Iref. The switching on time Ton of the switching element 331 is changed by the voltage level of the initial power Vin, and the current waveform for a first period is determined by the initial power Vin.

The calculator 321 includes a first terminal 321a which receives initial reference current Io_ref and a second terminal 321b which receives partial power Vin' divided from the initial power Vin, and outputs the reference current Iref corresponding to the changed partial power Vin' by controlling the initial reference current Io_ref. The calculator 321 calculates the reference current Iref with a formula to output the decreased reference current Iref with respect to rise in the initial power Vin. The formula may be, for example but not by way of limitation, Iref=Io_ref−a*Vin' or Iref=Io_ref−a*Vin'+b. a and b are constants which are set by a user. The formula may vary from the foregoing, as would be understood by one skilled in the art.

Figure 5:
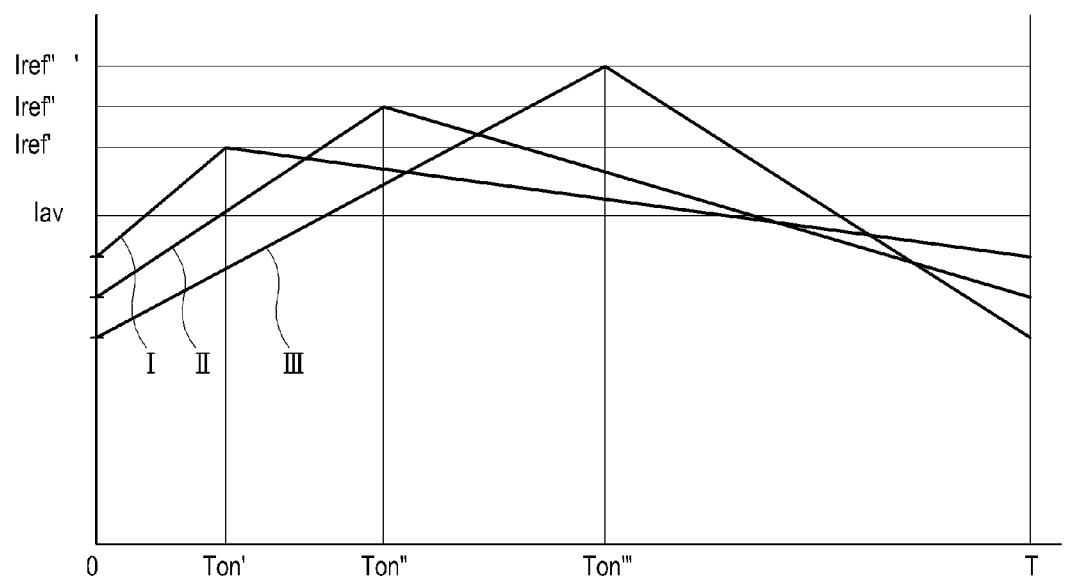
FIG. 5 is a graph which illustrates a reference current with respect to initial power of the backlight unit according to the second exemplary embodiment of the present invention.

FIG. 5 is a graph which illustrates a waveform of the reference current with respect to the changed initial power Vin with example waveforms I, II and III of the output current. As shown therein, the switching on time Ton lengthens in sequence of the first current waveform I, the second current waveform II and the third current waveform III. As the voltage level of the initial power Vin becomes lower, the switching on time Ton and the reference current Iref increase. The switching on time Ton of the first current waveform I is substantially shorter than those of the second and third current waveforms II and III. Thus, the reference current Iref of the first current waveform I is substantially smaller than the current waveforms II and III. The switching on time Ton of the third current waveform III is the longest, and the calculator 321 outputs the largest among the three reference currents Iref, to the switching controller 332. If the initial power Vin is changed according to the reference current Iref, an average value Iav of the current output to the point light source 200 remains the same. That is, if the initial power Vin is changed, the constant current is supplied to the point light source 200, thereby making the brightness of the point light source 200 uniform.

That is, the backlight unit according to the present exemplary embodiment employs the PWM control method to control the brightness of the point light source 200, and uses the analog control method to control the reference value of the current which is switched by the PWM control method.

Figure 6:
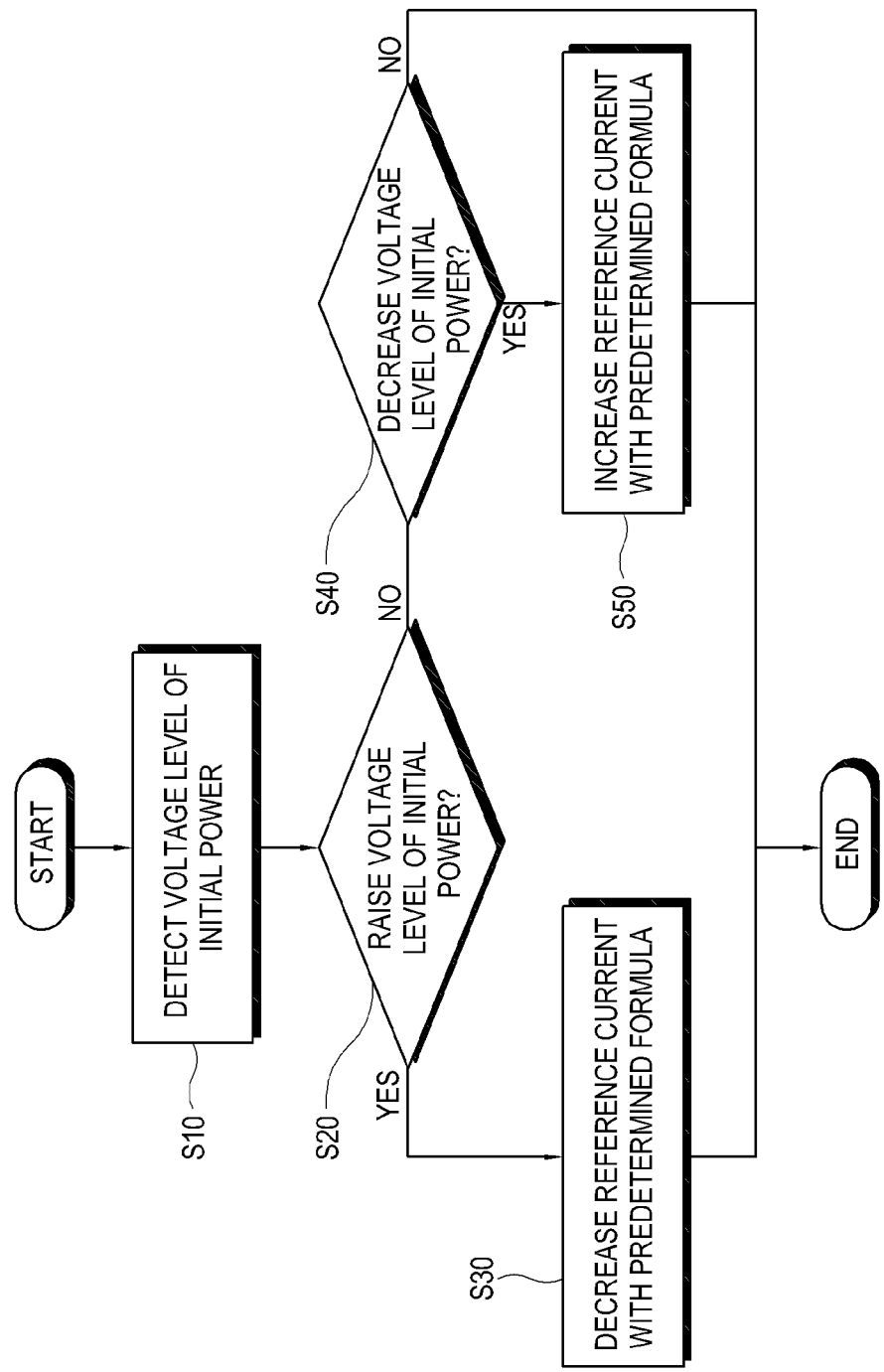
FIG. 6 is a control flowchart which explains a control method of a liquid crystal display device including the backlight unit according to the second exemplary embodiment of the present invention.

FIG. 6 is a control flowchart to explain a control method of a liquid crystal display device including the backlight unit according to the present exemplary embodiment. The control method of the liquid crystal display device according to the present exemplary embodiment will be described with reference to FIG. 6.

First, the voltage level of the initial power Vin is detected (S10). Here, the change of the initial power Vin may be detected through the partial power Vin' divided from the initial power Vin.

Then, it is determined whether the voltage level of the initial power Vin is raised (S20). If it is determined that the voltage level is raised, the calculator 321 decreases the reference current Iref by using the formula, for example, a predetermined formula as shown in operation S30.

If it is determined that the voltage level of the initial power Vin is not raised, it is determined whether the voltage level of the initial power Vin is decreased (S40).

If it is determined that the voltage level is decreased, the calculator 321 increases the reference current Iref by using the formula, for example, a predetermined formula as shown in operation S50.

If the change of the voltage level of the initial power Vin is not detected, the reference current is not changed.

Figure 7:
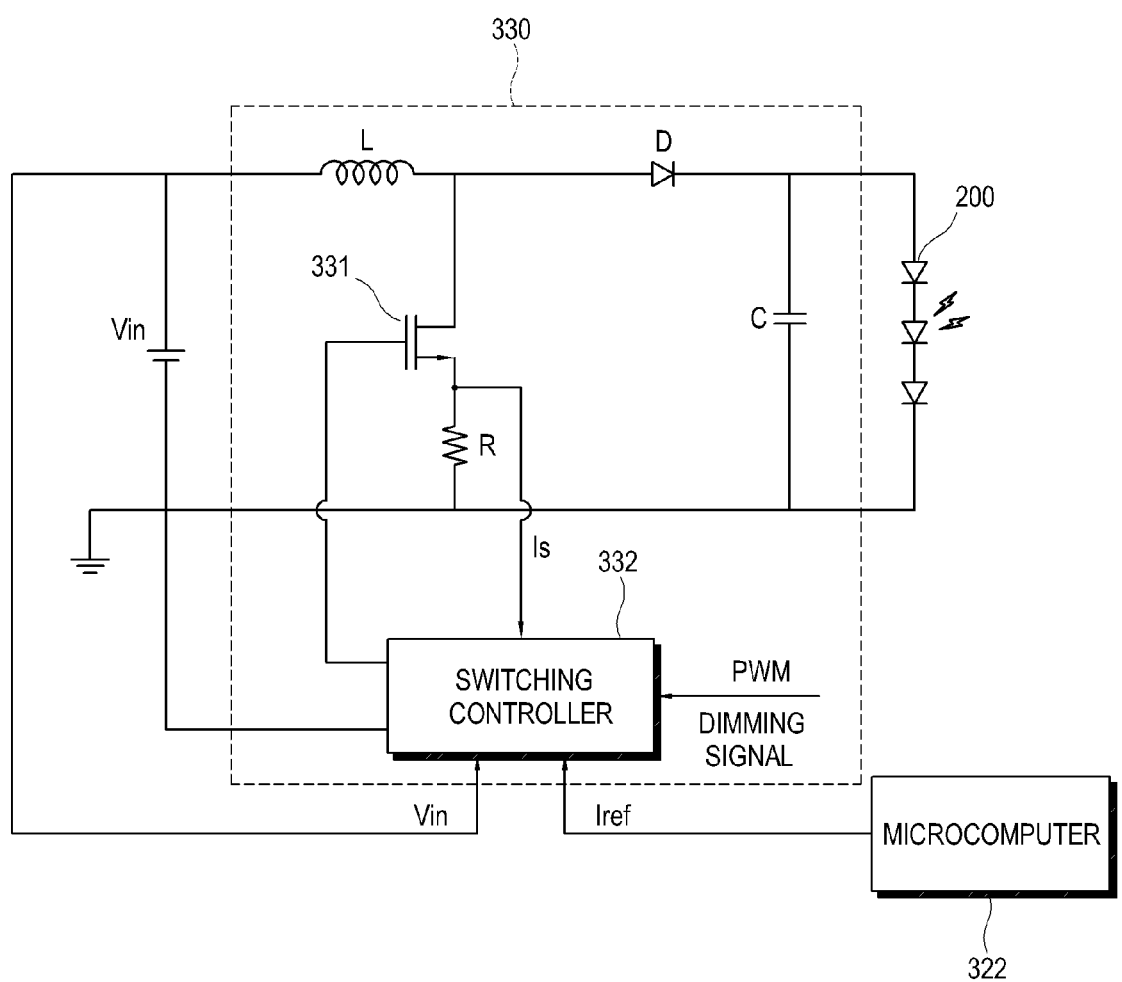
FIG. 7 is a schematic circuit diagram of a backlight unit according to a third exemplary embodiment of the present invention.

FIG. 7 is a schematic circuit diagram of a backlight unit according to a third exemplary embodiment of the present invention.

As shown therein, the backlight unit according to the present exemplary embodiment includes a microcomputer 322 which outputs a reference current Iref, and an inductor L connected between the initial power Vin and the switching element 331.

The microcomputer 322 stores a lookup table of the reference current Iref corresponding to the voltage level of the initial power Vin, and outputs the changed reference current Iref according to the changed initial power Vin by using the lookup table.

A power supply 330 according to the present exemplary embodiment includes a boost switching circuit which supplies power having higher voltage level than the initial power Vin to a point light source 220 by the inductor L connected between the initial power Vin and the switching element 331.

The exemplary embodiments may improve ununiformity of the output current due to changed switching on time Ton of the switching element 331 according to the initial power Vin in a backlight unit 400 including the switching element 331. That is, the present invention applies the analog control method to generate a variable reference current Iref corresponding to the changed initial power Vin and the PWM control method to control the switching element 331, and supplies uniform power to the point light source 200 accordingly.

As described above, the exemplary embodiments provide a backlight unit which outputs a stable current with respect to variable initial power, a liquid crystal display device having the same, and a control method thereof.

The exemplary embodiment is described above with reference to the flowchart illustration of FIG. 6. It should be understood that each block of the flowchart illustration can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause operational steps to be performed in the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). In some alternative implementations, the functions noted in the blocks may occur out of the illustrated order without departing from the scope of the invention. For example, two blocks shown in succession may in fact be executed substantially concurrently or in reverse order, depending upon the functionality involved. Further, various functions may be implemented in software and/or hardware without departing from the scope of the invention.

Although exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A liquid crystal display device comprising:
   a liquid crystal panel;
   a point light source which emits light to the liquid crystal panel; and
   a light source driver comprising:
      a power input terminal which receives an initial power,
      a power supply which includes a first output terminal and a second output terminal and supplies power through the first and second output terminals to the point light source according to the initial power and a reference current, the first output terminal being directly connected to the power input terminal, and the point light source being connected between the first output terminal and the second output terminal, and
      a reference current controller which detects change of a voltage level of the initial power without receiving a feedback of the power supplied by the power supply to the point light source and outputs the reference current according to the change of the voltage level of the initial power, to the power supply,
      wherein the power supply comprises:
         a switching element which switches a current output to the point light source,
         an inductor connected between the switching element and the second output terminal, and
         a switching controller which is directly connected to the power input terminal, receives the reference current output from the reference current controller and turns the switching element on and off according to the reference current received from the reference current controller, a pulse width modulation (PWM) dimming signal input from the outside, and a current flowing in the inductor connected between the switching element and the second output terminal.

2. The liquid crystal display device according to claim 1, wherein the reference current controller decreases the reference current as the voltage level of the initial power increases.

3. The liquid crystal display device according to claim 1, wherein the reference current controller comprises a first terminal which receives an initial reference current, a second terminal that receives a partial power divided from the initial power, and a calculator which adjusts the initial reference current as the reference current according to the partial power.

4. The liquid crystal display device according to claim 1, wherein the reference current controller comprises a microcomputer which stores a lookup table of the reference current corresponding to the voltage level of the initial power.

5. The liquid crystal display device according to claim 1, wherein a switching on time during which the switching element is turned on in a single period shortens as the voltage level of the initial power increases.

6. The liquid crystal display device according to claim 1, wherein the power supply further comprises a current detecting resistor which detects a current in the inductor.

7. The liquid crystal display device according to claim 1, wherein the point light source comprises a light emitting diode.

8. A backlight unit comprising:
a light emitting diode;
a power input terminal which receives an initial power;
a power supply which includes a first output terminal and a second output terminal and supplies power through the first and second output terminals to the light emitting diode according to the initial power and a reference current, the power input terminal being directly connected to the first output terminal, and the light emitting diode being connected between the first output terminal and the second output terminal; and
a reference current controller which detects change of a voltage level of the initial power without receiving a feedback of the power supplied by the power supply to the light emitting diode and outputs the reference current inverse proportional to an increase and a decrease of the voltage level of the initial power to the power supply,
wherein the power supply comprises:
a switching element which switches a current output to the light emitting diode,
an inductor connected between the switching element and the second output terminal, and
a switching controller which is directly connected to the power input terminal, receives the reference current output from the reference current controller and turns the switching element on and off according to the reference current received from the reference current controller, a PWM dimming signal input from the outside and a current flowing in the inductor connected between the switching element and the second output terminal.

9. The backlight unit according to claim 8, wherein the reference current controller comprises a first terminal which receives an initial reference current, a second terminal which receives a partial power divided from the initial power, and a calculator which adjusts the initial reference current as the reference current according to the partial power.

10. The backlight unit according to claim 8, wherein the reference current controller comprises a microcomputer which stores a lookup table of the reference current corresponding to the voltage level of the initial power.

11. The backlight unit according to claim 8, wherein a switching on time during which the switching element is turned on in a single period shortens as the voltage level of the initial power increases.

12. A method of controlling a liquid crystal display device which comprises a liquid crystal panel, a point light source to emit light to the liquid crystal panel, a reference current controller outputting a reference current, and a power supply comprising a power input terminal receiving an initial power, a first output terminal, a second output terminal, a switching element and an inductor connected between the switching element and the second output terminal, and a switching controller which is directly connected to the power input terminal and receives the reference current output from the reference current controller, the power input terminal being directly connected to the first output terminal, and the point light source being connected between the first output terminal and the second output terminal, the method comprising:
supplying power from the power supply to the point light source according to the initial power and a reference current;
detecting a voltage level of the initial power without receiving a feedback of the power supplied by the power supply to the point light source;
determining whether the detected voltage level of the initial power is changed;
controlling the reference current if the detected voltage level of the initial power is changed;
detecting a current flowing in the inductor; and
controlling by the switching controller, the switching element to adjust an amount of a current supplied to the point power source according to the reference current received from the reference current controller, a PWM dimming signal input from the outside and a current flowing in the inductor connected between the switching element and the second output terminal.

13. The method according to claim 12, wherein the controlling the reference current comprises decreasing the reference current if the voltage level of the initial power increases.

14. The method according to claim 13, wherein the detecting comprises detecting a level of a partial voltage divided from the initial power, and
the controlling comprises controlling an initial reference current as the reference current by using the level of the partial voltage and a formula.

15. The method according to claim 13, wherein the controlling comprises controlling the reference current by using a lookup table of the reference current corresponding to the voltage level of the initial power.

* * * * *